United States Patent [19]

Norton

[11] Patent Number: 4,726,437

[45] Date of Patent: Feb. 23, 1988

[54] SERVO STEERING SYSTEM

[76] Inventor: Peter Norton, 2730 Narraganset, Lansing, Mich. 48910

[21] Appl. No.: 859,342

[22] Filed: May 5, 1986

[51] Int. Cl.$^4$ ............................................. B62D 5/04
[52] U.S. Cl. ................................................... 180/79.1
[58] Field of Search ............................. 180/79.1, 142; 74/388 PS

[56] References Cited

U.S. PATENT DOCUMENTS

| | | | |
|---|---|---|---|
| 4,458,795 | 7/1984 | Norton | 180/79.1 |
| 4,577,116 | 3/1986 | Norton | 180/79.1 |

*Primary Examiner*—John A. Pekar
*Attorney, Agent, or Firm*—Reising, Ethington, Barnard Perry & Milton

[57] ABSTRACT

An electrically energized power steering system for vehicles is disclosed using a clutch that disengages the servomotor at times of near zero driver input torque. The servomotor is energized for power assist in executing turns and for synchronizing servomotor speed with the steering mechanism during the return of the dirigible wheels to the straight ahead position and at other times when the clutch is disengaging the servomotor thereby eliminating clashing upon clutch reengagement. A torque transducer operatively coupled with the steering wheel shaft and the steering gear generates a torque signal corresponding to the torque applied by the driver to the steering wheel. Two tachometers are provided, one on the servomotor and one on the steering wheel shaft and the outputs are combined to develop a signal corresponding to differential speed. The torque signal and the differential speed signal are added and the resultant signal is applied to the servo amplifier which energizes the servomotor. When the driver turns the steering wheel the clutch engages the servomotor, the torque signal predominates and the servomotor is energized to provide power assist. When the driver releases the steering wheel, the torque signal drops to approximately zero and the differential speed signal controls the energization of the servomotor to maintain its speed in near synchronization with the return of the dirigible wheels to the straight ahead position.

9 Claims, 6 Drawing Figures

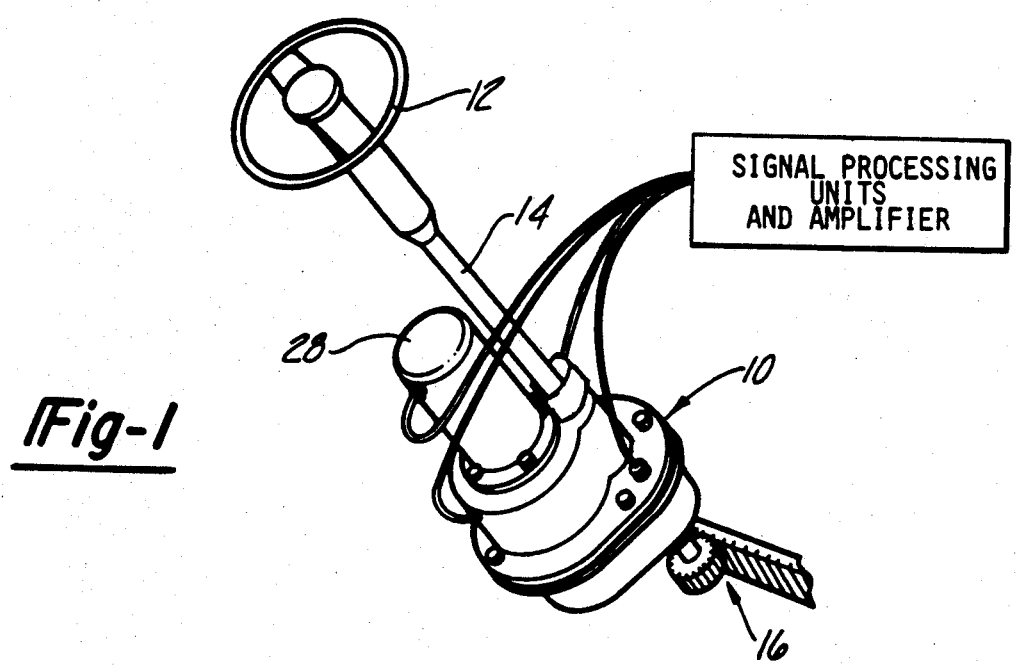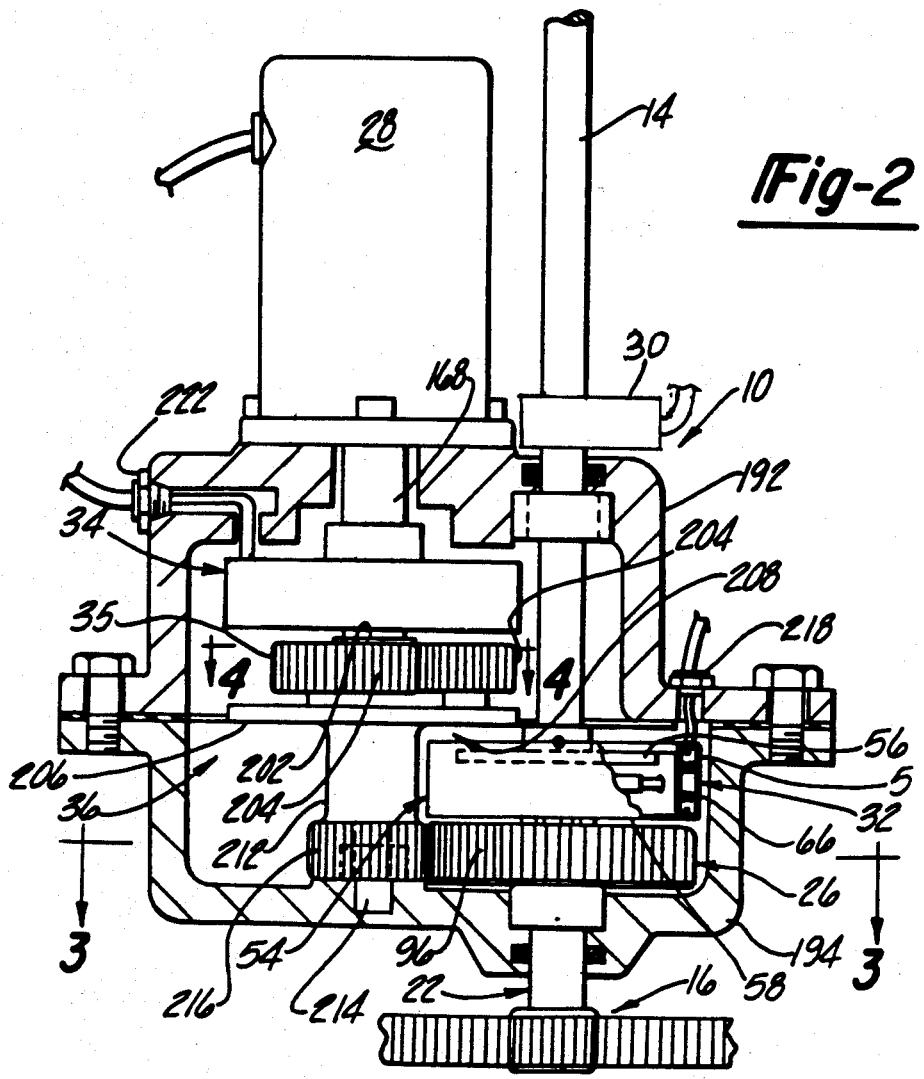

SERVO STEERING SYSTEM

FIELD OF THE INVENTION

This invention relates to vehicle power steering systems energized by electric servomotors with clutches for disengaging the servomotor from the steering system; more particularly, it relates to a control system for controlling an electric servomotor to maintain synchronism with the steering mechanism thereby reducing the clash upon clutch engagement.

BACKGROUND OF THE INVENTION

In general, a power steering system for an automotive vehicle comprises a servomotor which is controlled by the steering wheel for turning the dirigible wheels. Hydraulic servomotors are conventionally used and it is also known to utilize an electric servomotor.

In conventional vehicles, it is desirable for the dirigible wheels of the vehicle to automatically return to the straight ahead position after the driver has executed a turn and releases the steering wheel. In the conventional system, this is realized as the result of the geometry of the steering system. In particular, with the vehicle moving forward and the front wheels turned, the road forces acting on the front wheels tend to turn the front wheels back to the straight ahead position. This restoring force which originates from the reaction of the front wheels with the road surface, is transmitted through the steering linkage to the steering gear. Rotation of the steering gear to the straight ahead position drives the steering shaft and steering wheel to the straight ahead position. In power steering systems without a clutch to disengage the servomotor it also drives the servomotor. In the case of an hydraulic servomotor the drag forces are compensated by changing the steering geometry to increase the restoring force. However, in the case of an electric servomotor, the resisting force due to inertia and friction in the servomotor may be substantial in relation to the restoring force. To minimize the cost and weight of the servomotor it is desirable to use a large gear reduction ratio. This increases the effects of inertia and friction. Without special measures, the resisting force or drag imposed by the electric servomotor has the effect of slowing the return of the front wheels to the straight ahead position. Copending application Ser. No. 597,077, filed Apr. 5, 1984 by Peter Norton for *Coupling For Drive Shaft and Servomotor Driven Shaft With Uncoupled Neutral Position* discloses a clutch that disengages to eliminate servomotor drag when the driver is not applying torque to the steering wheel. However, under certain circumstances, this clutch can reengage at times when the servomotor speed is substantially different from the servomotor speed required to achieve synchronization with the steering mechanism and reengagement of the clutch at such times results in a clash which may be undesirable. This invention discloses a means for maintaining servomotor speed in approximate synchronization with steering mechanism speed so this clashing is minimized. U.S. Pat. No. 4,577,716 granted Mar. 25, 1986 to Peter Norton for *Servo Steering System* discloses a system which reduces or eliminates the resistance of the servomotor to the return of the dirigible wheels to the straight ahead position in servo steering systems in which there is no clutch or the clutch does not disengage the servomotor while the steering wheel is freely returning to the straight ahead position.

A general object of this invention is to provide a control system for reducing the speed difference between the servomotor and the steering gear and to include this capability in a power steering system in a neat and compact structure and to overcome certain disadvantages of the prior art.

SUMMARY OF THE INVENTION

In accordance with this invention, a vehicle power steering system with an electric servomotor and a clutch that disengages the servomotor during times of near zero driver input torque is provided with means for approximately synchronizing the rotation of the servomotor with the turning of the dirigible wheels toward the straight ahead direction at times when the clutch is disengaging the servomotor. This is accomplished by controlling the energization of the servomotor for both power assist in turning and speed synchronization during return of the dirigible wheels to the straight ahead position. For this purpose a speed difference signal indicative of the difference between the steering rate of the steering mechanism and the speed of the servomotor is developed and the servomotor is energized in accordance with the speed difference signal. More particularly, the servomotor and the steering wheel shaft are equipped with tachometers and a signal generating means is provided for generating a speed difference signal by differentially combining the outputs of the two tachometers. Control means responsive to the speed diffference signal controls energization of the servomotor whereby it is energized at times when it is disengaged to rotate at approximately the speed at which it is in synchronization with the steering system. Further, according to this invention, the control means is adapted to control the energization of the servomotor in accordance with a torque signal corresponding to the torque transmitted by the steering wheel. The torque signal and the speed difference signal are added to generate a control signal. At times when the driver input torque is small and the clutch is disengaging the servomotor, the servomotor is energized in response to the speed difference signal to the extent required to maintain approximately synchronous servomotor speed. At times when the clutch is engaging the servomotor the two tachometer signals are equal thereby causing the speed difference signal to be zero. At these times the control signal is the same as the torque signal and is therefore suitable for input to the servo amplifier to control the energization of the servomotor in accordance with torque transmitted by the steering wheel. More particularly, the control means comprises means for adding the speed difference signal and the torque signal for developing a signal for application to a servo amplifier for controlling the energization of the servomotor.

A more complete understanding of this invention may be obtained from the detailed description that follows taken with the accompanying drawings.

DESCRIPTION OF THE DRAWINGS

FIG. 1 is a perspective view of one embodiment of this invention in a power steering system for a vehicle;

FIG. 2 is a view, partially in section, of the power steering unit of FIG. 1;

BEST MODE FOR CARRYING OUT THE INVENTION

Figure 3:
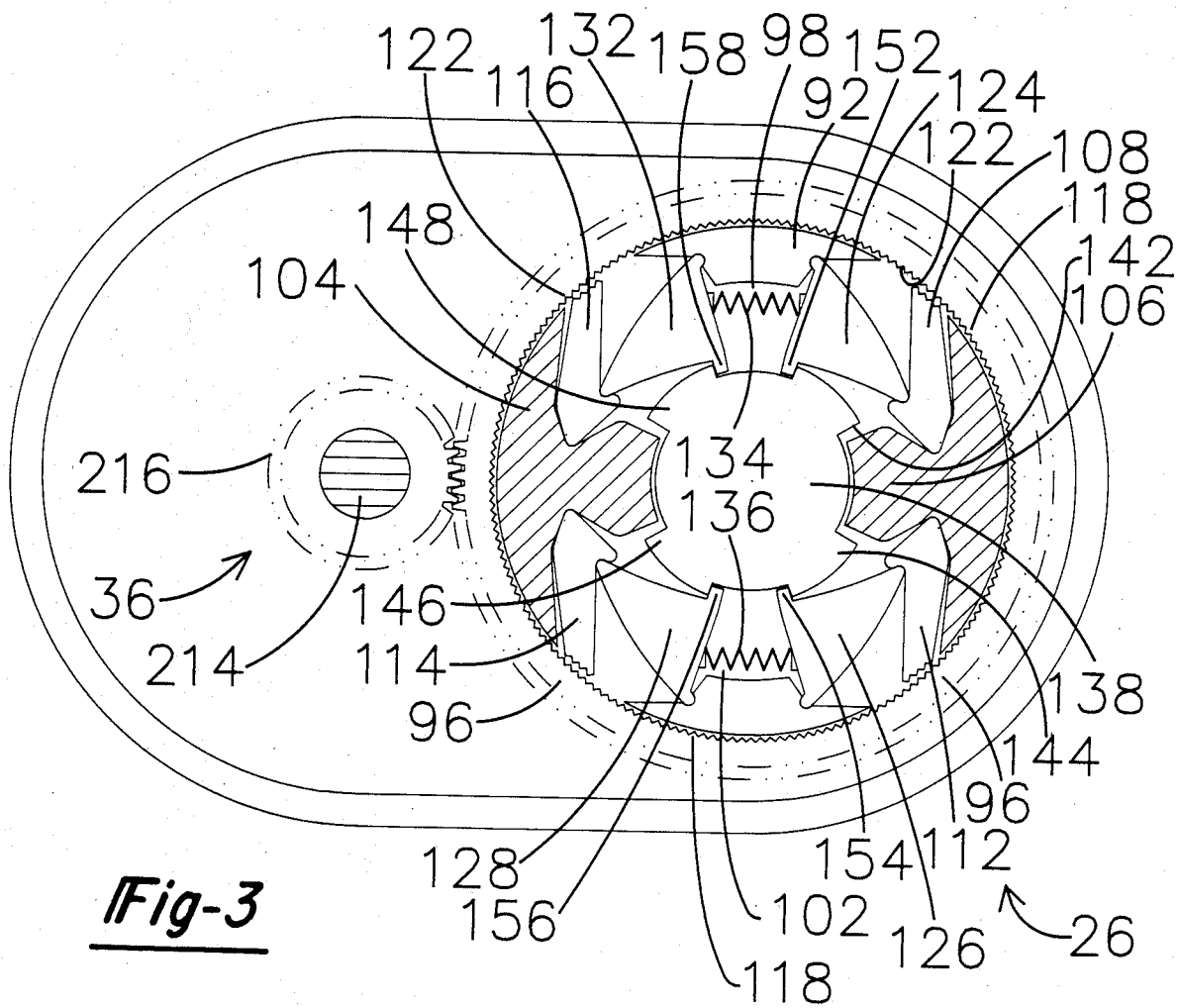
FIG. 3 is a view taken on lines 3—3 of FIG. 2.

Referring now to the drawings, the invention is shown in an illustrative embodiment in a power steering unit for a vehicle. It will be appreciated, as the description proceeds, that the invention may be embodied in other designs and used in other applications.

FIG. 1 of the drawings shows the power steering unit 10 of this invention installed in a typical automotive steering system. In general, the steering system comprises a steering wheel 12 which is connected through an upper steering shaft 14 to a steering gear 16. The steering gear 16 is operatively connected with the dirigible wheels of the vehicle for displacing the wheels in accordance with the rotative position of the steering wheel 12. The power steering unit 10 is interposed between the upper steering shaft 14 and the steering gear 16. The power steering unit 10 is provided with a servo system drive connection with the steering gear 16 and, for fail-safe purposes, it is also provided with a manual drive connection with the steering gear 16.

The power steering unit 10 will now be described in detail with reference to FIGS. 2 through 4. The upper steering shaft 14 and a lower steering shaft 22 are connected together by a drive transmitting, fail-safe coupling 26 which disengages the servomotor from the steering system when the torque applied by the driver to the steering wheel 12 is small. The coupling includes a lost motion coupling which provides an unyielding coupling between the shafts 14 and 22. The upper steering shaft 14 constitutes a manually actuated control member for the drive transmitting, fail-safe coupling 26. The coupling 26 is adapted under certain circumstances to transmit torque from the upper steering shaft 14 to the lower steering shaft 22. It is also adapted under certain circumstances to transmit torque from a servomotor 28 to the lower steering shaft 22. The drive transmitting, fail-safe coupling 26 will be described in more detail subsequently. A steering shaft tachometer 30 generates a signal corresponding to the rate of rotation of the upper steering shaft 14. A torque transducer 32 is operatively associated with the upper steering shaft 14 and lower steering shaft 22 and is adapted to develop an electric signal corresponding to the relative angular displacement therebetween and hence the turning effort or torque applied to the steering wheel 12 by the driver. The torque transducer 32 will be described in greater detail subsequently.

The servomotor 28, which is a reversible electric motor, is connected through a gear set 36 to the drive transmitting, fail-safe coupling 26 and thence to the steering gear 16. A servomotor tachometer 34 generates a signal corresponding to the rate of rotation of the servomotor shaft.

Figure 6:
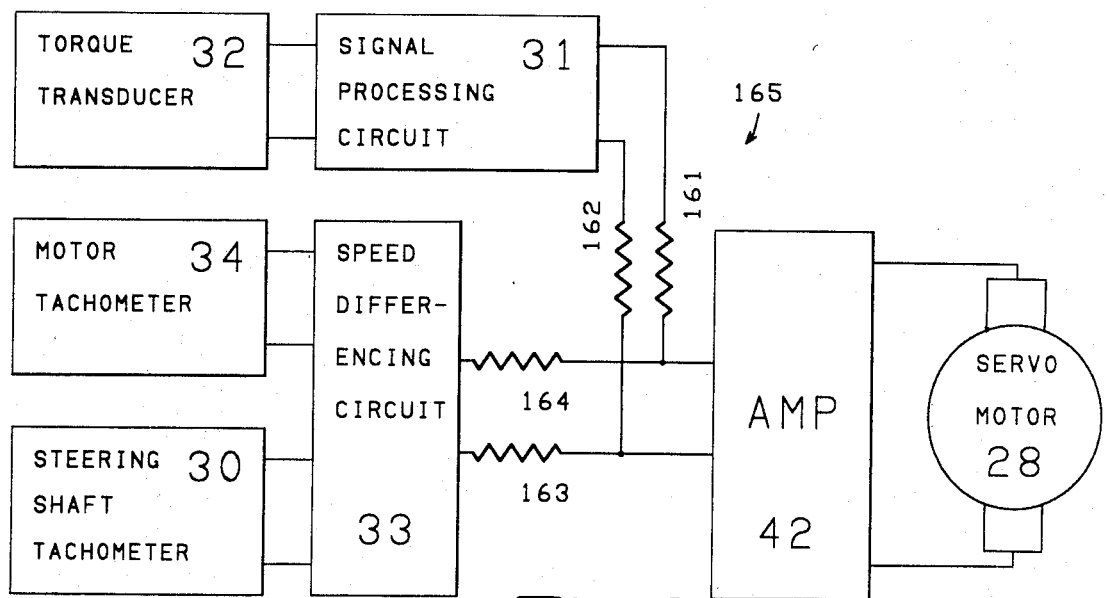
FIG. 6 is a block diagram of the servo system.

The servo system is shown in block diagram in FIG. 6. It comprises, in general, the torque transducer 32, two tachometers 30 and 34, a servo amplifier 42 and the servomotor 28. The torque transducer 32 is coupled to a signal processing circuit 31 which develops a torque signal which is applied through resistors 161 and 162 to the input of servo amplifier 42. Similarly, the tachometers 30 and 34 are coupled to a tachometer signal differencing circuit 33 which develops a speed difference signal which is applied through resistors 163 and 164 to the input of servo amplifier 42. The servo system will be described in greater detail subsequently; for present purposes, suffice it to say that the torque signal and speed difference signal are added and are applied to the input of the servo amplifier 42 which controls the energization of the servomotor 28. The servomotor 28 operates through the gear set 36 and the drive transmitting, fail-safe coupling 26 to actuate the steering gear 16 in accordance with the driver applied torque. In accordance with this invention, the tachometers 30 and 34 in combination with tachometer signal differencing circuit 33 generate a speed difference signal that is zero when the servomotor is engaged with the steering gear and is not zero when the servomotor is not engaged with the steering gear and is not rotating at the speed at which it would rotate if it were engaged. The speed difference signal is added to the torque signal for developing a control signal at the input of the servo amplifier 42. As a result, the servomotor is energized to provide steering assistance when it is engaged with the steering gear and is energized to rotate approximately as if it were engaged to the steering gear during the turning of the dirigible wheels toward the straight ahead direction when the torque signal is zero and the servomotor is not engaged with the steering gear.

Figure 5:
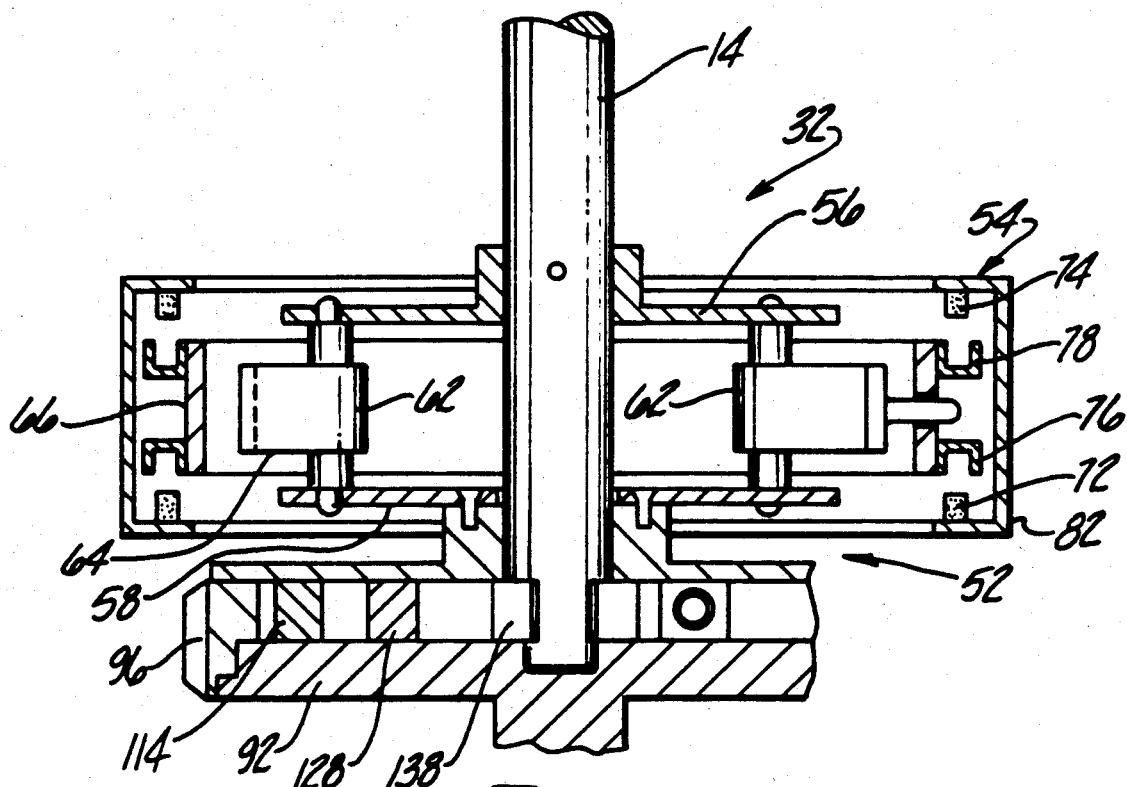
FIG. 5 shows a torque transducer for the power steering unit.

Before proceeding with a more detailed description of the power steering unit 10, it will be helpful to consider the torque transducer 32 as shown in FIG. 5. This transducer includes a motion converter of the type which is described and claimed in U.S. Pat. No. 4,548,091 granted Oct. 22, 1985 to Peter Norton for *Motion Converter For Use In Transducers And The Like.* The torque transducer 32 comprises, in general, a motion converter 52 and a linear displacement sensor 54. The motion converter 52 has an input member 56 which is connected with the upper steering shaft 14 for rotation therewith. It also comprises an input member 58 which is operatively connected with the lower steering shaft 22 for rotation therewith. There is a certain amount of torsional elasticity in the motion converter 52 so the relative rotation of the upper and lower shafts corresponds to the torque applied to the steering wheel 12 by the driver. (Alternatively, a motion converter or other angular displacement sensor of small torsional stiffness may be used and a torsionally elastic shaft with the desired stiffness may be connected between the upper and lower steering shafts 14 and 22.) The input members 56 and 58 of the motion converter 52 are coupled together by a set of links 62 which extend in an axial direction between the input members. Each link is provided with an amplifying arm 64 extending transversely of the link. An output member in the form of a carrier ring 66 is mounted on the free ends of the amplifying arms for movement therewith. In operation of the motion converter 52, the links 62, amplifying arms 64 and carrier ring 66 are positioned as shown in FIG. 5 with the input members 56 and 58 in a reference position, i.e. no relative angular displacement. If a clockwise torque is applied to the steering wheel 12 the input member 56 will be rotated in a clockwise direction relative to the input member 58. This will cause the links 62 to be inclined relative to the input member by reason of the flexure of the joints of the links with the input members 56 and 58. Accordingly, the amplifying arms 64 will be deflected upwardly by reason of the movement of the respective links. The amplifying arms 64 will be deflected in unison and the carrier ring 66 will be moved linearly along the axis of the angular displacement. If, on the other hand, a counterclockwise torque is applied to the steering wheel 12 the input member 56 will be rotated in a counterclockwise direction relative to the input member 58. This will cause the links 62 to be inclined in the other direction and the amplifying arms 64, and hence the carrier ring 66, will be deflected downwardly.

The linear displacement sensor 54 is of the variable inductance type and comprises a pair of coils 72 and 74. The inductance of the first coil 72 is influenced by a core member 76 of annular configuration which is mounted on the carrier ring 66 for movement therewith. The inductance of the second coil 74 is influenced by an annular core member 78 which is also mounted on the carrier ring 66 for movement therewith. The coils 72 and 74 are mounted on a coil support member 82 which is stationary. The inductance of each of the coils 72 and 74 varies with the proximity of the core members 76 and 78, respectively, and hence in accordance with the relative angular displacement of the upper steering shaft 18 and the lower steering shaft 22. The torque transducer 31 is coupled with the tachometer signal differencing circuit 33 which is responsive to the inductance variation of the coils 72 and 74 to produce a signal voltage corresponding to the driver applied torque.

The drive transitting, fail-safe coupling 26 will now be described in greater detail with reference to FIGS. 2 and 3. This drive transmitting coupling is suitably of the type disclosed and claimed in copending application Ser. No. 597,077, filed Apr. 5, 1984 by Peter Norton for *Coupling For Drive Shaft and Servomotor Driven Shaft With Uncoupled Neutral Position*. The drive transmitting, fail-safe coupling 26 comprises, in general, a coupling block 92 which is connected through lower steering shaft 22 with the steering gear 16. A ring gear 96 is rotatably mounted on the peripheral surface of the coupling block 92 and is driven by the output of the planetary gear set 35 which is connected to the servomotor 28. The coupling block 92 is an annular member and includes two opposing compartments 98 and 102 which are separated by internal diametrically opposed abutments or stop flanges 104 and 106. A set of elongated pawls 108, 112, 114 and 116 are rotatably fitted within the compartment to pivot in respective seating pockets formed in the stop flanges 104 and 106. The outer end of each pawl is formed with teeth to fit into triangular notches 122 which are formed between the teeth 118 on the inside surface of the ring gear 96. Each tooth 118 is symmetrical about a radius line of the ring gear and the notches are equally spaced along the surface of the gear so that the pawls engage whichever notches are adjacent to them at any particular time. The pawls operate as unidirectional connectors, i.e. pawls 108 and 114 positively lock the coupling block 92 and the ring gear 96 together for rotation in one direction but release, in a ratchetlike action, in the event of opposite relative rotation of the gear upon the coupling block. Conversely, the pawls 112 and 116 lock the ring gear 96 to the coupling block 92 for rotation in the other direction with ratcheting when the rotation is reversed. Consequently, by engaging pawls 108 and 114, or alternatively by engaging pawls 112 and 116, the ring gear 96 will be locked to the coupling block 92 for drive in one direction but will slip if the drive direction is reversed.

The pawls 108, 112, 114 and 116 are actuated by intermediate actuators 124, 126, 128 and 132, respectively. The intermediate actuators are generally triangular in configuration and each has a rounded corner in pivotal engagement with a seating pocket in the coupling block 92. Another rounded corner of each actuator is pivotally engaged with a corresponding pawl in a seating pocket thereof. A spring 134 acts between the intermediate actuators 124 and 132 and urges them apart thereby urging the respective pawls into engagement with the triangular notches in the ring gear 96. Similarly, a spring 136 urges the intermediate actuators 126 and 128 apart and the pawls 112 and 114 are thereby urged outwardly to engage notches in the ring gear 96.

Figure 4:
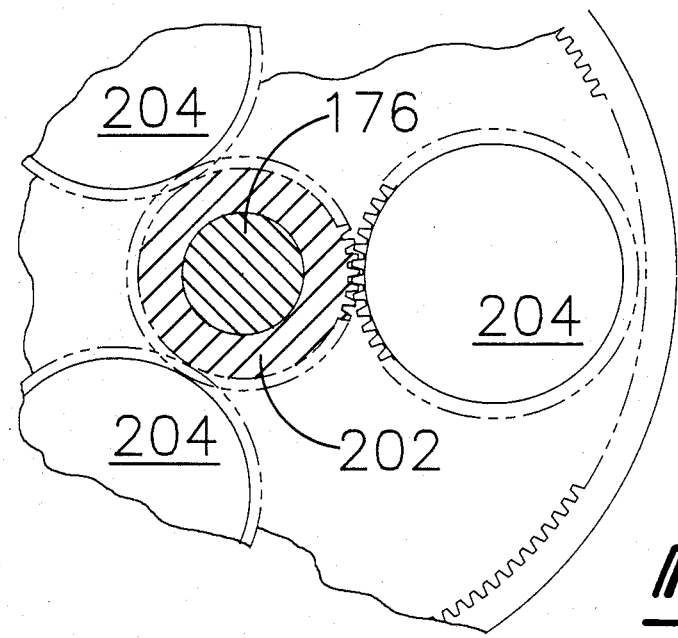
FIG. 4 is a view taken on lines 4—4 of FIG. 2.

As shown in FIG. 3, the upper steering shaft 14 terminates in a central actuator 138 which is located within the coupling block 92. The central actuator 138 fits into a central recessed portion located between the stop flanges 104 and 106. The central actuator 138 is provided with teeth 142, 144, 146 and 148 which are adapted to engage tabs 152, 154, 156 and 158, respectively, on the intermediate actuators 124, 126, 128 and 132. Consequently, rotation of the upper steering shaft 14 relative to the coupling block in one direction causes the teeth 144 and 148 to move away from the tabs 154 and 158 respectively thereby allowing the respective intermediate actuators 126 and 132 to rotate causing the respective pawls 112 and 116 to rotate into their engaged positions with the teeth of the ring gear 96. Rotation of the upper steering shaft 14 in the other direction causes the teeth 142 and 146 to move away from the tabs 152 and 156, respectively, thereby allowing the respective intermediate actuators 124 and 128 to rotate causing the pawls 108 and 114 to rotate into their engaged positions with the ring gear 96.

The operation of the drive transmitting, fail-safe coupling 26 is as follows. With the parts of the drive transmitting, fail-safe coupling 26 in the positions as shown in FIG. 3, the teeth on the pawls 108, 112, 114 and 116 are disengaged from the triangular notches 122 in the ring gear 96 and thereby enable the ring gear to rotate with respect to the coupling block 92 in either a clockwise or counter clockwise direction. In normal operation, the driver turns the steering wheel 12 in either direction and the angular displacement sensor generates a corresponding torque signal which is applied to the servo amplifier 42 which energizes the servomotor 28. Simultaneously, the turning of the steering wheel 12 will cause the teeth on one of the pairs of pawls 112 and 116 or 108 and 114 to engage the notches of ring gear 96. The servomotor transmits power through the gear set 36 to the ring gear 96 to cause it to follow the rotation of the upper steering shaft 14 by the steering wheel 12. Thus, the coupling block 92 drives the steering gear 16 for steering the vehicle in accordance with the movement of the steering wheel 12. In the event of a power failure or malfunction, the drive transmitting, fail-safe coupling 26 is operative to provide fail-safe direct manual drive for the steering gear 16 and also to disengage any power drive which might be applied in a direction opposite to the desired turning direction. In case of a partial loss of electrical power, rotation of the steering wheel 12 in a clockwise direction causes the central actuator 138 to rotate clockwise, as viewed in FIG. 3, causing the teeth 144 and 148 which engage the tabs 154 and 158 and to thereby rotate the intermediate actuators 126 and 132 respectively, causing the teeth of the pawls 112 and 116 to be disengaged from the notches in the ring gear 96. Teeth 146 and 142 allow intermediate actuators 124 and 128 to rotate under urging of springs 134 and 136 respectively causing the pawls 108 and 114 to engage the ring gear 96 for coupling to the coupling block 92 for power assistance in the clockwise turning direction; however, power assist cannot be applied through the ring gear 96 in the opposite direction since pawls 112 and 116 are disengaged and the pawls 108 and 114 would ratchet over the teeth of the ring gear. Further rotation of the central actuator 138 causes the teeth 142 and 146 thereon to engage the stop flanges 106 and 104 respectively. This provides a direct drive connection between the upper steering shaft 14 and the coupling block 92 for applying direct manual drive torque from the steering wheel 12 to the steering gear 16. Thus, there is a lost motion connection between the central actuator 138 and the coupling block 92. To the extent that the power assist system is able to produce torque even though at a lower level than required for normal operation, that torque, if applied in the direction of the desired rotation, will assist the turning of the coupling block 92. Conversely, if the power assist system applies torque in the opposing direction, such as due to malfunctioning of the servomotor, then that torque causes idling rotation of the ring gear 96 on the coupling block 92 without transmission of torque. Thus, wrongly directed torque does not oppose or interfere with the direct rotational effort of the direct drive of the steering wheel 12 through the central actuator 138 to the coupling block 92. The operation of the drive transmitting, fail-safe coupling 26 has been described with reference to turning of the steering wheel 12 in the clockwise direction; it will now be appreciated that the coupling operates in an analogous manner when the steering wheel 12 is turned in the counter clockwise direction.

The servomotor control system will now be described in greater detail with reference to FIG. 6. This system comprises, in general, the torque transducer 32, signal processing circuit 31, servomotor tachometer 34, steering shaft tachometer 30, tachometer signal differencing circuit 33, resistor network 165 and servo amplifier 42. The output of torque transducer 32 is processed by signal processing circuit 31 to produce a signal derived from the torque the driver is applying to the steering wheel 12 that is suitable for application to the input of the servo amplifier 42. The outputs of steering shaft tachometer 30 and servomotor tachometer 34 are processed by tachometer signal differencing circuit 33 to produce a signal proportional to their difference that is suitable for application to the input of the servo amplifier 42. The output of signal processing circuit 31 is combined with the output of tachometer signal differencing circuit 33 by resistor network 165 consisting of resistors 161, 162, 163 and 164. To compensate for attenuation in resistor network 165 the output of signal processing circuit 31 is increased relative to the signal required to directly drive servo amplifier 42. When the output of tachometer signal differencing circuit 33 is zero the input to servo amplifier 42 is the same as it would be if the tachometers and tachometer signal differencing circuit 33 were omitted. As will be explained subsequently, the output of tachometer signal differencing circuit 33 is zero when the drive transmitting, failsafe coupling 26 is engaging gear set 36 to the steering gear to enable assist by servomotor 28. When the output of tachometer signal differencing circuit 33 is not zero it influences the signal at the input of servo amplifier 42. When the coupling 26 is disengaging the servomotor, the effect of the output of tachometer signal differencing circuit 33 is to cause servomotor 28 to rotate at approximately the speed at which it would rotate if the coupling 26 were engaged. In the following, the condition when the servomotor is rotating at the speed at which it would rotate if coupling 26 were engaged is referred to by saying the servomotor is rotating synchronously with the steering gear.

Steering shaft tachometer 30 produces a differential output signal proportional to the rotation rate of upper steering shaft 14. Steering shaft tachometer 30 may be any tachometer capable of indicating algebraically the rate of rotation of upper steering shaft 14, that is the signal is negative for rotation in one direction and positive for rotation in the other direction. Servomotor tachometer 34 produces a differential output signal proportional to the rotation rate of servomotor shaft 168. Servomotor tachometer 34 may be any tachometer capable of indicating algebraically the rate of rotation of the servomotor shaft 168.

The outputs of tachometers 30 and 34 are combined by tachometer signal differencing circuit 33 to produce an output signal that is zero whenever ring gear 96 is rotating at the same rate as upper steering shaft 14. To accomplish this the gains of the two tachometers are adjusted to make the output of steering shaft tachometer 30 equal to the output of servomotor tachometer 34 when the speed of servomotor 28 equals the speed of upper steering shaft 14 times the speed reduction factor of gear set 36. Since there is little lost motion between upper steering shaft 14 and lower steering shaft 22 which is the input to the steering gear, the condition for the output of tachometer signal differencing circuit 33 to be zero approximates the condition for servomotor 28 to be rotating synchronously with the steering gear. This approximation is particularly accurate when the driver has released the steering wheel 12 to allow the wheels to return to the straight ahead position because then there is no torque being applied to the steering wheel 12 and very little relative rotation between upper steering shaft 14 and lower steering shaft 22.

When the drive transmitting, fail-safe coupling 26 is engaged, servomotor 28 is rotating synchronously with the steering gear and the tachometer outputs are approximately equal. Tachometer signal differencing circuit 33 combines the tachometer output signals and produces an output signal proportional to their difference. From the above it follows that the output signal from tachometer signal differencing circuit 33 will be approximately zero when coupling 26 is engaged. From this it follows that when coupling 26 is engaged the performance of the system is approximately the same as the performance of the known systems. However, small motions of the steering wheel 12 within the lost motion limits will cause tachometer signal differencing circuit 33 to have output signals different from zero. In fact, these signals anticipate control signals from the output of the torque transducer 32 and thereby enhance the response of servomotor 28 to driver input.

At times when the driver input torque is near zero, coupling 26 is not engaged. At these times the pawls 108, 112, 114 and 116 are all disengaged from ring gear 96 as illustrated in FIG. 3 so the ring gear 96 is free to rotate on the coupling block 92 and the servomotor speed is not necessarily synchronous. When the servomotor speed is different from the synchronous speed the output of tachometer signal differencing circuit 33 is proportional to the amount of the difference. The output of tachometer signal differencing circuit 33 is applied to the input of servo amplifier 42 through resistor network 165 which causes servo amplifier 42 to energize servomotor 28 in proportion to the amount by which its speed is less than synchronous speed. Therefore the speed of servomotor 28 will stabilize at a speed that is less than synchronous speed by an amount determined by the gain of tachometer signal differencing circuit 33.

The construction of the overall power steering unit 10 will now be described with reference to FIGS. 2 through 4. The power steering unit 10 comprises an upper housing member 192 and a lower housing member 194 which are bolted together to form a sealed unit. The upper steering shaft 14 extends through the upper housing member 192 and is connected near its lower end with the input member 56 of the torque transducer 32. Steering shaft tachometer 30 is located at a convenient point on upper steering shaft 14 which might be a location inside the passenger compartment of the vehicle. The upper steering shaft 14 is connected with the central actuator 138 of the drive transmitting, fail-safe coupling 26, as described above. The coupling block 92 of the coupling 26 is connected through lower steering shaft 22 with the steering gear 16. The servomotor 28 is mounted on the upper housing member 192 and the shaft 168 thereof is connected with the sun gear 202 of planetary gear set 35. The planetary gear set 35 comprises sun gear 202 and planetary gears 204 rotatably mounted on a circular plate 206 of a planetary carrier 208. They mesh with a ring gear 252 which is fixedly mounted in the upper housing member 192. The planetary carrier 208 includes a shaft 212. The shaft 212 carries a pinion gear 216 which meshes with the ring gear 96 of the drive transmitting, fail-safe coupling 26. The linear displacement sensor 54 of the torque transducer 32 is electrically coupled through an electrical connector 218 to the signal processing circuit 31 previously described with reference to FIG. 6. Similarly, the servomotor tachometer 34 is coupled through a connector 222 to the tachometer signal differencing circuit 33 previously described with reference to FIG. 6. The steering shaft tachometer 30 is coupled directly to the tachometer signal differencing circuit 33 previously described with reference to FIG. 6.

The operation of the power steering unit 10 will now be described with particular reference to FIGS. 2 and 6. When the driver turns the steering wheel 12 in a clockwise direction for a right-hand turn, the drive transmitting, fail-safe coupling 26 engages and the torque transducer 32 develops a signal which is applied to the signal processing circuit 31 and thence through resistor network 165 to the input of the servo amplifier 42. The servo amplifier 42 energizes the servomotor 28 which drives the planetary gear set 35 to turn the pinion gear 216 which drives the ring gear 96 of the drive transmitting, fail-safe coupling 26. Consequently, the lower steering shaft 22 drives the steering gear 16 to follow the rotation of the upper steering shaft 14 to execute the right-hand turn. The operation just described is obtained when the driver applies a normal turning effort to the steering wheel 12 in turning a corner, for example. In such a usual turn, the output of tachometer signal differencing circuit 33 approximates zero so that the servomotor 28 is energized in accordance with the output of torque transducer 32 to provide the power assist desired for turning.

When the right-hand turn has been executed, as described above, the driver may choose to release the steering wheel 12 in order that the dirigible wheels of the vehicle may return to the straight ahead direction. Release of the steering wheel 12 by the driver allows the torsional elasticity of the motion converter 52 to rotate the upper steering shaft 14 and steering wheel 12 to the position in which the input members 56 and 58 of the motion converter 52 are in their reference position, i.e. there is no relative angular displacement therebetween, as described above with reference to FIG. 5. With the input members 56 and 58 of the motion converter 52 in their reference position, the upper steering shaft 14 and the lower steering shaft 22 are correspondingly in a position of zero relative angular displacement with respect to each other and therefore the drive transmitting, fail-safe coupling 26 is in its disengaged state, i.e. the pawls 108, 112, 114, and 116 are disengaged from the ring gear 96. As previously described, this causes the drive transmitting fail-safe coupling 26 to disengage the servomotor 28 from the steering system. Further, the output signal produced by the torque transducer 32 is substantially zero because the input members 56 and 58 of the motion converter 52 are in their reference position. As described previously, the road forces acting on the dirigible wheels of the vehicle tend to return them to the straight ahead position. This turning effort originating at the dirigible wheels is transmitted through the steering linkage to the steering gear 16 and thence through the drive transmitting, fail-safe coupling 26, torsionally elastic motion converter 52, and upper steering shaft 14 to the steering wheel 12 tending to return it to the straight ahead position. During the return of the dirigible wheels and steering wheel to the straight ahead positions, the servomotor 28 is energized under the control of the tachometer signal differencing circuit 33 to operate the servomotor 28 in near synchronism with the steering gear 16 in a manner to be described presently.

The operation of the system when the driver releases the steering wheel upon completion of a turn will now be described. When the steering wheel is released to come out of the right hand turn, as described above, the servomotor 28 is exerting effort to maintain the dirigible wheels in the orientation for a right hand turn. In the following discussion it will be assumed that in this initial state the servomotor 28 is not rotating but this is only to simplify the discussion and the system would function similarly if the servomotor 28 were not initially stopped. When the steering wheel is released to come out of the right hand turn the torsional elasticity of the motion converter 52 rotates the upper steering shaft 14 into approximate alignment with the lower steering shaft 22, as described above, thereby causing the drive transmitting, fail-safe coupling 26 to disengage the servomotor 28 from the steering system. The return of the input members 56 and 58 of the motion converter 52 to their reference position causes the output signal produced by the torque transducer 32 to diminish to substantially zero. As steering wheel 12 rotates in its return to the straight ahead position, steering shaft tachometer 30 generates a signal indicating the rate of rotation of the upper steering shaft 14. Assuming, as discussed above, that servomotor 28 is initially stopped; the output of servomotor tachometer 34 is initially zero. The signals from tachometers 30 and 34 are combined by the tachometer signal differencing circuit 33 and applied through resistor network 165 to the input of servo ampifier 42. Since the servomotor 28 is initially stopped and the upper steering shaft 14 is rotating, the output of the tachometer signal differencing circuit 33 is not zero. When the rotation of the upper steering shaft 14 achieves a predetermined rate, dependent upon the gain of the tachometer signal differencing circuit 33, the friction in servomotor 28 is overcome and it begins to rotate in the direction corresponding to the rotation of steering wheel 12 in response to the drive from servo amplifier 42. As the rate of rotation of servomotor 28 increases the signal from servomotor tachometer 34 increases correspondingly and the output of tachometer signal differencing circuit 33 decreases. Thus the servomotor 28 rotates at a rate slightly less than the rate of rotation at which it rotates in synchronism with the steering gear 16.

It will now be understood that the operation of the power steering unit 10 for a left-hand turn is analogous to that just described for the right hand turn.

If, while the steering wheel 12 is in the process of returning freely to the straight ahead position, the driver should apply torque to steering wheel 12 in either direction and thereby cause angular displacement between the input members 56 and 58 of the motion converter 52 the angular displacement sensor generates a corresponding torque signal which is applied to the servo amplifier 42 which energizes the servomotor 28, as described previously. Simultaneously, the relative rotation between the upper steering shaft 14 and coupling block 92 will cause the teeth on one of the pairs of pawls 112 and 116 or 108 and 114 to engage the notches of ring gear 96 to enable the servomotor 28 to transmit power through the gear set 36, the ring gear 96, the coupling 96, and lower steering shaft 22 to the steering gear 16. If the servomotor 28 were not rotating approximately in synchronism with the steering gear then the engagement of the teeth on one of the pairs of pawls 112 and 116 or 108 and 114 with the notches of ring gear 96 would be accompanied by a sudden change in the speed of the servomotor 28 and gear set 36 with resulting stress and noise which are prevented by this invention.

Although this invention has been described with reference to a particular embodiment, it is not to be construed in a limiting sense. Many variations and modifications will now occur to those skilled in the art. For a definition of the invention reference is made to the appended claims.

What is claimed is:

1. In a vehicle power steering system of the type comprising a manual input means, a steering gear, an electric servomotor having an output shaft, a clutch operatively disposed between said output shaft and said steering gear and adapted to be engaged or disengaged, means for generating a torque signal corresponding to the torque transmitted by said manual input means, and control means adapted to control the energization of said servomotor in accordance with said torque signal, the improvement comprising:
   synchronizing means for controlling the energization of said servomotor for rotation of said output shaft in approximate synchronization with the rotation of said manual input means when said clutch is disengaged.

2. The invention as defined in claim 1 wherein said synchronizing means comprises:
   a first tachometer adapted to produce a first tachometer signal corresponding to the rate of rotation of said manual input means,
   a second tachometer adapted to produce a second tachometer signal corresponding to the rate of rotation of said output shaft of said servomotor,
   means responsive to said tachometer signals for producing a difference signal,
   means responsive to said difference signal for controlling the energization of said servomotor.

3. The invention as defined in claim 2 wherein said means responsive to said difference signal comprises:
   means for combining said difference signal with said torque signal for developing a control signal,
   an amplifier,
   and means for applying said control signal to said amplifier for controlling the energization of said servomotor.

4. The invention as defined in claim 1 wherein,
   said means for generating a torque signal comprises an angular motion to linear motion converter with a means for converting linear motion to an electric signal.

5. In a vehicle power steering system of the type comprising a manual input means, a steering gear, an electric servomotor having an output shaft, a clutch operatively disposed between said output shaft and said steering gear and adapted to be engaged or disengaged, means for generating a torque signal corresponding to the torque transmitted by said manual input means, and control means adapted to control the energization of said servomotor in accordance with said torque signal, the improvement comprising:
   a first tachometer adapted to produce a first tachometer signal corresponding to the rate of rotation of said manual input means,
   a second tachometer adapted to produce a second tachometer signal corresponding to the rate of rotation of said output shaft of said servomotor,
   means responsive to said tachometer signals for producing a difference signal,
   means responsive to said difference signal for controlling the energization of said servomotor.

6. The invention as defined in claim 5 including speed reducing gear means operatively coupled between said servomotor and said steering gear wherein said difference signal varies directly with the difference between the rotational speed of said manual input means and the rotational speed of said servomotor output shaft reduced by the reduction ratio of said speed reducing means.

7. The invention as defined in claim 6 wherein,
   said speed reducing gear means comprises a planetary reduction gear means.

8. The invention as defined in claim 5 wherein said means responsive to said difference signal comprises:
   means for combining said difference signal with said torque signal for developing a control signal,
   an amplifier,
   and means for applying said control signal to said ampifier for controlling the energization of said servomotor.

9. The invention as defined in claim 5 wherein,
   said means for generating a torque signal comprises an angular motion to linear motion converter with a means for converting linear motion to an electric signal.

* * * * *